Figure 1:
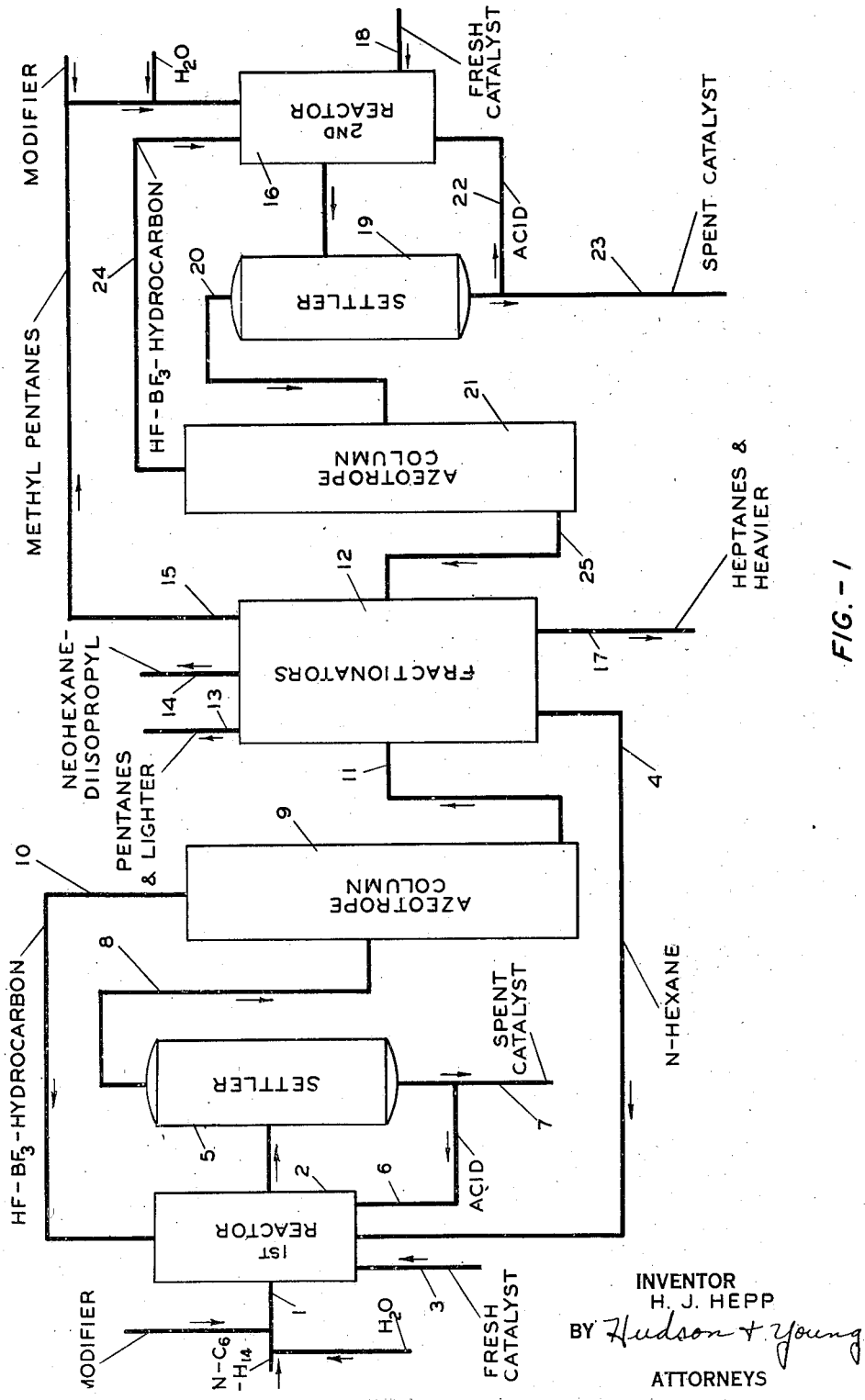

Feb. 15, 1949.  H. J. HEPP  2,461,545
ISOMERIZATION PROCESS
Filed Aug. 7, 1944  2 Sheets-Sheet 1

INVENTOR
H. J. HEPP
BY Hudson & Young
ATTORNEYS

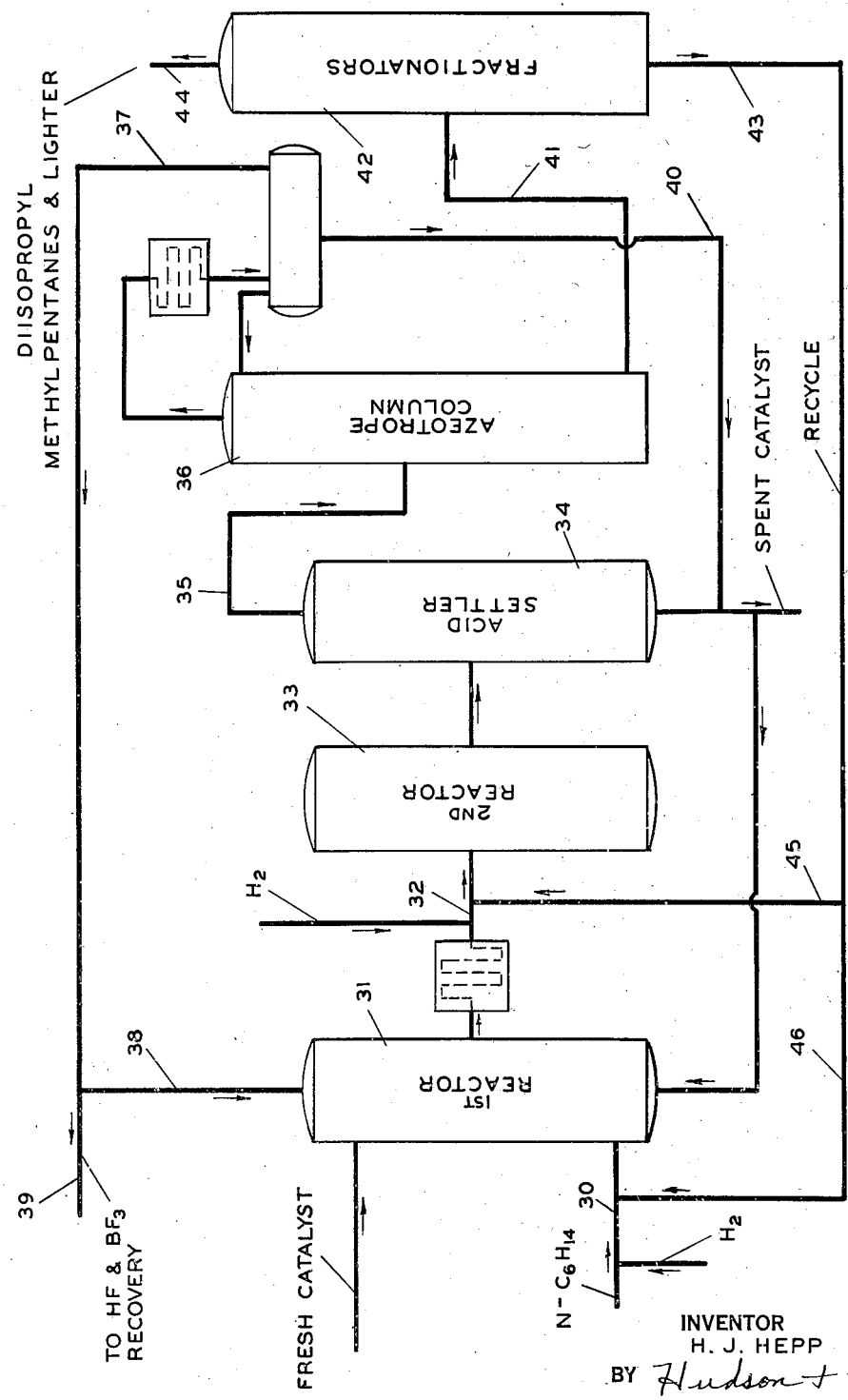

Patented Feb. 15, 1949

2,461,545

UNITED STATES PATENT OFFICE 2,461,545

ISOMERIZATION PROCESS

Harold J. Hepp, Bartlesville, Okla., assignor to Phillips Petroleum Company, a corporation of Delaware Application August 7, 1944, Serial No. 548,379

7 Claims. (Cl. 260—683.5)

This invention relates to the catalytic conversion of normal hexane to isohexanes of high antiknock rating and more specifically diisopropyl and neohexane. More particularly, it relates to such a process wherein hydrogen fluoride containing 1 to 10 weight per cent of boron trifluoride based on the weight of hydrogen fluoride is used as the catalyst and wherein modifiers, namely hydrogen, cycloparaffins or aromatics are employed to minimize the formation of homologs.

For background, attention is directed to the copending applications of F. E. Frey, Serial No. 460,867, filed Oct. 5, 1942, directed to isomerization and reconstruction of $C_4$ to $C_6$ paraffins with a catalyst consisting of hydrogen fluoride and from 1 to 10% by weight of boron trifluoride based on the weight of hydrogen fluoride, and Serial No. 511,444, filed Nov. 23, 1943, directed to the use of water in a proportion not exceeding the molecular equivalent of the boron trifluoride in the isomerization or reconstruction of low-boiling normal paraffins with a catalyst consisting of hydrogen fluoride and from 1 to 10% by weight of $BF_3$ based on the hydrogen fluoride, and to the application of John L. Richmond, Serial No. 509,611, filed November 9, 1943, and directed to the use of cycloparaffins in amount up to 25% by weight of the hydrocarbon charge in such processes which are now known as "Isoversion."

The principal object of the present invention is to provide an improved process for isomerizing normal hexane to isohexanes of high antiknock rating in good yield. Another object is to provide an economical process of the foregoing type which yields diisopropyl and also neohexane usually in smaller amounts than the diisopropyl. Another object is to provide a two stage isomerization process of the foregoing type. Another object is to provide such a two stage process wherein common fractionating means are used for fractionating the effluents from both stages and for preparing the feed and recycle stream to the second stage. Numerous other objects will hereinafter appear.

In the accompanying drawings, Figure 1 portrays diagrammatically a preferred arrangement of equipment for use in carrying out the present invention. Figure 2 shows a modified arrangement of equipment which may be employed at some sacrifice of flexibility and yield.

The present invention comprises isomerizing normal hexane in a first step or stage to form methyl pentanes as the principal product. The conditions of time, temperature and catalyst composition used in this step are relatively severe and relatively small amounts of modifiers selected from the group consisting of hydrogen, cycloparaffins and aromatics are employed since normal hexane is of high stability. The methyl pentanes thus formed being less stable than normal hexane are treated in a second catalytic step or stage under relatively milder conditions of time, temperature or catalyst composition and larger amounts of restrainer or modifier are used than were employed in the first step. By this means the relatively unstable diisopropyl is conserved.

The catalyst used in each stage is hydrogen fluoride containing from 1 to 10 weight per cent of boron trifluoride based on the weight of hydrogen fluoride. As the modifier or restrainer I may use elemental hydrogen, cycloparaffins or aromatics or combinations of two or more thereof. As the cycloparaffin, I prefer to use methyl cyclopentane but I may employ other cycloparaffins having from 5 to 7 carbon atoms in the ring and alkyl derivatives thereof. As the aromatic hydrocarbon employed as inhibitor, I prefer to use benzene and its homologs such as toluene and xylene.

The process will now be described with reference to Figure 1 of the drawing. The fresh normal hexane, modifier and a small amount of water passes via line 1 to the first reactor 2. Fresh catalyst enters via line 3. Recycled normal hexane enters via line 4. The effluent passes to settler 5 where it separates into an acid-rich and a hydrocarbon-rich phase. The acid phase is in part returned to reactor 2 via line 6 and in part passed via line 7 to a catalyst regenerator. The hydrocarbon phase passes via line 8 to azeotrope column 9, the overhead from which, containing hydrogen fluoride, boron trifluoride and some hydrocarbon is recycled to the reaction via line 10. The kettle product from column 9 passes via line 11 to the fractionation system 12 which separates it into (1) a fraction of pentanes and lighter leaving via line 13, (2) a fraction of neohexane and diisopropyl leaving via line 14, (3) a fraction of methyl pentanes which is passed via line 15 to the second reactor 16, (4) a fraction of normal hexane which is recycled to the first reactor via line 4 and (5) a fraction of heptanes and heavier leaving via line 17.

The stream of methyl pentanes in line 15 is fed into the second reactor 16, appropriate amounts of modifier and water being admixed therewith. Fresh catalyst is fed to reactor 16 via line 18. The effluent from reactor 16 passes to settler 19 where it is separated into a hydrocarbon phase which is fed via line 20 to azeotrope column 21 and an acid phase which is in part returned to reactor 16 via line 22 and in part withdrawn via line 23 for regeneration or disposal in any other manner.

In azeotrope column 21 the hydrocarbon phase is separated into an overhead of HF, BF₃, and some hydrocarbon which is recycled via line 24 and a kettle product which is fed via line 25 into fractionating system 12.

A considerable simplification of the arrangement of Figure 1 where hydrogen is shown as the modifier is portrayed in Figure 2 which involves some sacrifice of flexibility over the arrangement of Figure 1. In Figure 2, the normal hexane in admixture with hydrogen is charged to the first reactor 31 via line 30. Relatively high temperature and lower hydrogen pressure are maintained in reactor 31 to effect maximum conversion of normal hexane to isohexanes. The effluents are cooled and after admixture with more hydrogen are passed via line 32 directly into the second reactor 33. The total products are reacted in the second reactor usually at somewhat lower temperature and relatively high hydrogen pressure. The effluents from reactor 33 pass to acid settler 34. The acid phase is in part recycled to reactor 31 and in part withdrawn. The hydrocarbon phase passes via line 35 to azeotrope column 36. The overhead from azeotrope column 36 is condensed and separated into two phases. The upper or hydrocarbon layer which is composed of hexanes and lighter hydrocarbons and minor proportions of hydrogen fluoride and boron trifluoride is in part employed as reflux for column 36 and the balance is withdrawn via line 37 whence it is in part recycled via line 38 and in part withdrawn to recovery via line 39. The lower or acid layer which is composed of hydrogen fluoride, boron trifluoride and small proportions of dissolved hydrocarbons is passed via line 40 into admixture with the acid phase withdrawn from settler 34.

The kettle product from azeotrope column 36 is passed via line 41 to fractionation system 42 where it is separated into a recycle stream withdrawn via line 43 and an overhead leaving via line 44. Most of the recycle is returned via line 45 to the second reactor 33, but a sufficient volume is returned to the first reactor 31 via line 46 to prevent an undue build-up of the normal hexane. The recycle may be topped if desired. The overhead product leaving via line 44 may be debutanized and used as such or may be subjected to further fractionation.

The following considerations apply to the invention in all of its aspects. The conversions may be the same in both reactors, but preferably the conditions are so adjusted that the per pass conversion is not above about 60 to 70% in the first reactor and not above about 30 to 40% in the second. The conversion increases with the temperature, the contact time and the boron fluoride content of the catalyst, but decreases with increasing modifier concentration. The exact conditions for optimum conversion are therefore somewhat interpendent but in general should be about as follows:

| | Temperature, F. | Contact Time, Min. | BF₃ Content [1] |
|---|---|---|---|
| 1st Reactor | 100-250 | 10-200 | 1-10 |
| 2d Reactor | 100-200 | 20-60 | 1-5 |

[1] Per cent by weight based on the weight of hydrogen fluoride employed.

Usually higher concentrations of the modifier are maintained in the second reactor than in the first. The modifier may be cycloparaffins or aromatics in concentrations of 2 to 25 weight per cent of the feed, or hydrogen at a partial pressure of 10 to 300 p. s. i., or a combination of these. Relatively high concentrations of modifiers are required in the second reactor to prevent formation of lower and high-boiling homologs from the reactive isohexanes. The optimum amount of modifier may be readily determined by experiment. Cycloparaffins will be largely isomerized in the reactors and may be recycled if desired. Hydrogen may be recycled to the reactors with the overhead from the azeotrope column.

It appears from experimental data that when normal hexane is isomerized (as in the first reactor) in the presence of modifiers, the first product of the reaction is methyl pentanes providing the extent of conversion is not too great. When the conversion is less than about 60 to 70% the concentration of methyl pentanes may build up to 45 to 50% of the effluent from the catalyst chamber, with relatively small amounts of the hexanes going to other hydrocarbons. Usually the sum of neohexane and diisopropyl does not exceed about 20% of the effluent, the ratio of diisopropyl to neohexane being about 1.5:1. With higher conversions of the normal hexane, the methyl pentanes are also converted but the product is chiefly hydrocarbons other than hexanes. The maximum yield of methyl pentanes, diisopropyl and neohexanes is thus obtained in the first step at conversions of about 60% or less.

Similarly it appears that methyl pentanes may be isomerized (as in the second reactor) in the presence of modifiers giving high yields of diisopropyl providing the conversion is not above about 35%.

Examples

Technical grade n-hexane and 2-methyl pentane were charged in separate runs to a stirred reactor which was maintained at the desired temperature and which was about half full of hydrofluoric acid-boron fluoride catalyst. A small amount of water and a reactor modifier were present in each case. After the desired reaction time the hydrocarbon phase was removed and analyzed. Data pertaining to the runs are as follows:

| Run | A | B | C | D | E | F |
|---|---|---|---|---|---|---|
| Charge | n-Hexane | n-Hexane | n-Hexane | 2-Methyl Pentane | 2-Methyl Pentane | 2-Methyl Pentane |
| Modifier | MCP [1] | MCP [1] | MCP [1]+H$_2$ | MCP [1] | MCP [1] | H$_2$ |
| Temperature, F | 140 | 176 | 176 | 160 | 158 | 140 |
| Time, Min | 131 | 22 | 10 | 40 | 40 | 20 |
| Pressure, p. s. i. | 530 | 204 | 173 | 112 | 106 | 335 |
| BF$_3$ in Catalyst, Wt. per cent | 7 | 2.1 | 3.1 | 2.1 | 2.1 | 4.5 |
| Feed Composition, Wt. per cent: | | | | | | |
| n-hexane | 79 | 95 | 94.5 | | | |
| 2-Methyl pentane | | | | 84.4 | 93.5 | 100 |
| Methyl cyclopentane | 21 | 5 | 5.5 | 15.6 | 6.5 | |
| | 100 | 100 | 100.0 | 100.0 | 100.0 | 100 |
| Partial Pressure of Hydrogen, p. s. i. | | | 27 | | | 240 |
| Paraffin reacted, per cent | 36 | 45.0 | 56.2 | 85.3 | 33.2 | 28.1 |
| Cycloparaffin reacted, Wt. per cent | 45 | ([3]) | 82 | 81 | 92 | |
| Composition of Product, Wt. per cent: | | | | | | |
| Pentanes and Lighter | 0.5 | 2.9 | 4.4 | 1.1 | 1.2 | 6.0 |
| Neohexane | 1.1 | 3.6 | 6.2 | 5.3 | 5.8 | 3.1 |
| Diisopropyl | 1.9 | 6.2 | 9.2 | 17.8 | 14.7 | 16.2 |
| Methyl pentanes | 21.9 | 27.8 | 33.5 | 54.6 | 62.4 | 71.9 |
| n-Hexane | 50.6 | 52.3 | 41.4 | 4.9 | 15.9 | |
| Heptanes and heavier [2] | 24.0 | 7.2 | 5.3 | 16.3 | | 2.8 |
| | 100.0 | 100.0 | 100.0 | 100.0 | 100.0 | 100.0 |

[1] Methyl Cyclopentane.
[2] Includes cyclics.
[3] Not determined.

In a process with first and second reactors operating respectively as under B and D above, the yield of the neohexane-diisopropyl fraction is 82.2 weight per cent of the n-hexane charged. The ASTM (clear) octane rating of this fraction should be 85 to 90 or higher, depending upon the efficiency of the fractionators. Throughout the specification, including the claims, it is intended that a reference to "a small amount of water" present in the reaction zone shall mean an amount not exceeding the "molecular equivalent" of the boron fluoride present and that "molecular equivalent" shall be understood to mean mole for mole. In other words, the upper limit of water in either step of the isomerization process is one mole of water for each mole of boron fluoride.

I claim:

1. A process for isomerizing normal hexane to diisopropyl and neohexane which comprises isomerizing normal hexane in a first step by means of a catalyst consisting essentially of hydrogen fluoride containing from 1 to 10 weight per cent of boron trifluoride based on the hydrogen fluoride under relatively severe conditions to produce methyl pentanes as the principal product, separating the effluent into an acid phase and a hydrocarbon phase, azeotropically distilling said hydrocarbon phase to produce an overhead of hydrogen fluoride, boron trifluoride and some hydrocarbon and a bottoms of the heavier components, recycling said overhead to said first step, fractionally distilling said bottoms in a fractional distillation zone to produce separate fractions of (1) pentanes and lighter, (2) neohexane and diisopropyl and (3) methyl pentanes, isomerizing said methyl pentanes in a second step by means of a catalyst consisting essentially of hydrogen fluoride containing from 1 to 10 weight per cent of boron trifluoride based on the hydrogen fluoride under relatively mild conditions to convert said methyl pentanes to diisopropyl and neohexane, separating the effluent into an acid phase and a hydrocarbon phase, azeotropically distilling said hydrocarbon phase to produce an overhead of hydrogen fluoride, boron trifluoride and some hydrocarbon and a bottoms of the heavier components, recycling said last-named overhead to said second step, and passing said last-named bottoms to said fractional distillation zone and distilling it therein together with said first-named bottoms.

2. A process for isomerizing normal hexane to diisopropyl which comprises isomerizing normal hexane in a first step by means of a catalyst consisting essentially of hydrogen fluoride containing from 1 to 10 weight per cent of boron trifluoride based on the hydrogen fluoride under relatively severe reaction conditions such that the per pass conversion of normal hexane is not above 70 per cent, the conversion temperature being from 100 to 250° F. and the contact time being from 10 to 200 minutes and in the presence of a relatively small amount of a modifier which minimizes the formation of homologs to produce methyl pentanes as the principal reaction product together with a small amount of diisopropyl, isomerizing said methyl pentanes so produced in a second step by means of a catalyst consisting essentially of hydrogen fluoride containing from 1 to 5 weight per cent of boron trifluoride based on the hydrogen fluoride under relatively mild conditions compared to those employed in said first step and such that the per pass conversion of methyl pentanes is not above 40 per cent, the conversion temperature in said second step being from 100 to 200° F. and the contact time being from 20 to 60 minutes and in the presence of a larger amount than that employed in said first step of a modifier which minimizes the formation of homologs to produce diisopropyl as the principal reaction product, and recovering the diisopropyl produced in said first and second steps as a product of the process.

3. A process for isomerizing normal hexane to diisopropyl which comprises isomerizing normal hexane in a first step by means of a catalyst consisting essentially of hydrogen fluoride containing from 1 to 10 weight per cent of boron trifluoride based on the hydrogen fluoride under relatively severe reaction conditions such that the per pass conversion is not above 70 per cent to produce methyl pentanes as the principal reaction product, in a fractionation system separately recovering a fraction of methyl pentanes and a fraction of diisopropyl from the resulting isomerization effluent, isomerizing said methyl pentanes in a second step by means of a catalyst consisting essentially of hydrogen fluoride containing from 1 to 10 weight per cent of boron fluoride based on the hydrogen fluoride under reaction conditions which are relatively mild compared to those employed in said first step and such that the per pass conversion is not above 40 per cent to produce diisopropyl as the principal reaction product, and in said fractionation system recovering the unconverted methyl pentanes and the diisopropyl from the isomerization effluent from said second step together with said fraction of methylpentanes and said fraction of diisopropyl respectively.

4. A process for isomerizing normal hexane to diisopropyl which comprises isomerizing normal hexane in a first step by means of a catalyst consisting essentially of hydrogen fluoride containing from 1 to 10 weight per cent of boron trifluoride based on the hydrogen fluoride under relatively severe reaction conditions such that the per pass conversion of normal hexane is not above 70 per cent in the presence of a relatively small amount of modifier which minimizes the formation of homologs to produce methyl pentanes as the principal reaction product together with a small amount of diisopropyl, in a fractionation system separately recovering a fraction of methyl pentanes and a fraction of diisopropyl from the resulting isomerization effluent, isomerizing said methyl pentanes in a second step by means of a catalyst consisting essentially of hydrogen fluoride containing from 1 to 10 weight per cent of boron trifluoride based on the hydrogen fluoride under relatively mild conditions compared to those employed in said first step and such that the per pass conversion of methyl pentanes is not above 40 per cent in the presence of a relatively large amount of a modifier which minimizes the formation of homologs of isohexanes to produce diisopropyl as the principal reaction product, and in said fractionation system recovering the unconverted methyl pentanes and the diisopropyl from the isomerization effluent from said second step together with said fraction of methyl pentanes and said fraction of diisopropyl respectively.

5. The process of claim 2 wherein said modifier in each of said first and second steps is methyl cyclopentane in an amount lying between 2 and 25 per cent of the hydrocarbon feed.

6. A process for isomerizing normal hexane to diisopropyl and neohexane, diisopropyl being formed in major amount and neohexane being formed in minor amount, which comprises subjecting a feed consisting of 95 weight per cent of normal hexane and 5 weight per cent of methyl cyclopentane to isomerization in a first step by means of a catalyst consisting of hydrogen fluoride containing 2.1 weight per cent of boron trifluoride, maintaining a temperature of 176° F. and a pressure of 204 pounds per square inch in said first step, holding the reactants in said first step for 22 minutes and thereby effecting conversion of 45 per cent of said normal hexane with the production of methyl pentanes, diisopropyl and neohexane, the methyl pentanes being formed in major proportion and the diisopropyl and the neohexane being formed in minor proportion, segregating said methyl pentanes from the effluent of said first step and subjecting same to isomerization in a second step in the presence of 15.6 weight per cent of methyl cyclopentane based on the hydrocarbon fed to the second step by means of a catalyst consisting of hydrogen fluoride containing 2.1 weight per cent of boron trifluoride, maintaining a temperature of 160° F. and a pressure of 112 pounds per square inch in said second step, holding the reactants in said second step for 40 minutes and thereby effecting conversion of 35.3 per cent of the methyl pentane fed thereto, and thereby converting said methyl pentane fed to said second step to diisopropyl in major proportion and neohexane in minor proportion, and recovering the diisopropyl and neohexane produced in said first and second steps as a product of the process.

7. The process of claim 3 in which a small amount of water not exceeding the molecular equivalent of the boron fluoride is present in each of said first and second steps.

HAROLD J. HEPP.

REFERENCES CITED

The following references are of record in the file of this patent:

UNITED STATES PATENTS

| Number | Name | Date |
|---|---|---|
| 2,265,870 | Schuit | Dec. 9, 1941 |
| 2,266,012 | d'Ouville | Dec. 16, 1941 |
| 2,278,934 | Lee | Apr. 7, 1942 |
| 2,280,710 | Lynch | Apr. 21, 1942 |
| 2,283,852 | Egloff | May 19, 1942 |
| 2,315,078 | Pines | Mar. 30, 1943 |
| 2,325,122 | Ipatieff | July 27, 1943 |
| 2,331,429 | Sensel et al. | Oct. 12, 1943 |
| 2,355,198 | Atwell | Aug. 18, 1944 |
| 2,357,495 | Bloch | Sept. 5, 1944 |
| 2,394,797 | McAllister et al. | Feb. 12, 1946 |
| 2,402,807 | Egloff | June 25, 1946 |
| 2,408,752 | Burk | Oct. 8, 1946 |

FOREIGN PATENTS

| Number | Country | Date |
|---|---|---|
| 52,359 | Holland | Mar. 17, 1942 |

Certificate of Correction

Patent No. 2,461,545.

February 15, 1949.

HAROLD J. HEPP

It is hereby certified that error appears in the printed specification of the above numbered patent requiring correction as follows:

Columns 5 and 6, in the table, fifth column, line 11 thereof, for "85.3" read *35.3*; and that the said Letters Patent should be read with this correction therein that the same may conform to the record of the case in the Patent Office.

Signed and sealed this 23rd day of August, A. D. 1949.

[SEAL]

THOMAS F. MURPHY,
*Assistant Commissioner of Patents.*